United States Patent [19]
Mantey et al.

[11] Patent Number: 6,018,429
[45] Date of Patent: Jan. 25, 2000

[54] TAPE SERVO PATTERN WITH EMBEDDED SERVO TRACK NUMBER IDENTIFICATION

[75] Inventors: John Paul Mantey; Steven Gregory Trabert, both of Boulder; Ronald Dean Gillingham, Longmont; Richard Lewis O'Day, Boulder, all of Colo.

[73] Assignee: Storage Technology Corporation, Louisville, Colo.

[21] Appl. No.: 09/216,397

[22] Filed: Dec. 18, 1998

Related U.S. Application Data

[62] Division of application No. 08/804,428, Feb. 21, 1997, Pat. No. 5,898,533.

[51] Int. Cl.⁷ .................................................. G11B 5/09
[52] U.S. Cl. .............................................................. 360/48
[58] Field of Search .......................... 360/48, 72.2, 77.12

[56] References Cited

U.S. PATENT DOCUMENTS

| | | |
|---|---|---|
| 4,462,053 | 7/1984 | Lum et al. . |
| 4,472,750 | 9/1984 | Klumpp et al. . |
| 4,498,129 | 2/1985 | Velazquez . |
| 4,586,094 | 4/1986 | Chambors et al. . |
| 4,646,175 | 2/1987 | Sokolik et al. . |
| 4,843,493 | 6/1989 | Furuhata et al. . |
| 4,996,609 | 2/1991 | Joannou . |
| 5,229,895 | 7/1993 | Schwarz et al. . |
| 5,384,669 | 1/1995 | Dunn et al. . |
| 5,386,324 | 1/1995 | Fry et al. . |
| 5,394,280 | 2/1995 | Chliwyj et al. . |
| 5,396,376 | 3/1995 | Chambors et al. ........................ 360/48 |
| 5,408,366 | 4/1995 | Bentley et al. . |
| 5,568,327 | 10/1996 | Pahr et al. ................................ 360/53 |
| 5,675,447 | 10/1997 | Goker et al. . |

OTHER PUBLICATIONS

Timing Based Track Following Servo for Magnetic Tape; Barrett, Albrecht, Eaton; IEEE; Jul., 1996.

Design of a Disk File Head Positioning Servo; R. K. Oswald; IBM J. Res Develop.; Nov., 1974.

*Primary Examiner*—W. Chris Kim
*Attorney, Agent, or Firm*—Wayne P. Bailey; Paul M. Schwartz

[57] ABSTRACT

A magnetic tape servo pattern including track identification. Information from a track identification area intersecting one or more tracks on each frame in combination with information identifying the track as odd or even, is used to uniquely identify the track.

13 Claims, 4 Drawing Sheets

TAPE SERVO PATTERN WITH EMBEDDED SERVO TRACK NUMBER IDENTIFICATION

This is a divisional of application Ser. No. 08/804,428 filed on Feb. 21, 1997 U.S. Pat. No. 5,898,533.

BACKGROUND OF THE INVENTION

1. Field of the Invention

The invention relates to the field of dynamic magnetic information storage or retrieval. More particularly, the invention relates to the field of automatic control of a recorder mechanism. In still greater particularity, the invention relates to track identification. By way of further characterization, but not by way of limitation thereto, the invention is a servo pattern including a track identification field.

2. Description of the Related Art

Magnetic tape recording has been utilized for many years to record voice and data information. For information storage and retrieval, magnetic tape has proven especially reliable, cost efficient and easy to use. In an effort to make magnetic tape even more useful and cost effective, there have been attempts to store more information per given width and length of tape. This has generally been accomplished by including more data tracks on a given width of tape. While allowing more data to be stored, this increase in the number of data tracks results in those tracks being more densely packed onto the tape. As the data tracks are more closely spaced, precise positioning of the tape with respect to the tape head becomes more critical as errors may be more easily introduced into the reading or writing of data. The tape—tape head positioning may be affected by variations in the tape or tape head, tape movement caused by air flow, temperature, humidity, tape shrinkage, and other factors, especially at the outside edges of the tape.

In order to increase data track accuracy, servo tracks have been employed to provide a reference point to maintain correct positioning of the tape with respect to the tape head. One or more servo tracks may be used depending upon the number of data tracks which are placed upon the tape. The sensed signal from the servo track is fed to a control system which moves the head and keeps the servo signal at nominal magnitude. The nominal signal occurs when the servo read gap is located in a certain position relative to the servo track.

Referring to FIG. 1, a one-half inch wide length of magnetic tape 11 may contain up to 288 or more data tracks on multiple data stripes 12. A thin film magnetic read head is shown in upper position 13 and lower position 14 to read data from data tracks 12. If a tape read head has sixteen elements and, with movement of the head to multiple positions, each element can read nine tracks, then that magnetic read head could read 144 tracks. In order to read more tracks, such as 288 in the desired configuration, two data bands 15 and 16 are utilized. The tape head is movable to nine tracking positions in each of upper position 13 and lower position 14. That is, with the tape head in position 13 it can read 144 tracks in data band 15 and in position 14 it can read 144 tracks in data band 16. With dual data bands 15 and 16 and multiple head positions within those bands, tape head positioning is critical.

In order to achieve accurate multiple head positions it may be desirable to include up to five or more servo stripes 17. Servo stripes 17 may utilize various patterns or frequency regions to allow precise tape to tape head positioning in multiple positions. This allows a data read head to more accurately read data from data stripes 12. Referring to FIG. 2, servo stripes 17 are shown in greater detail. As is disclosed in copending patent application entitled TAPE SERVO PATTERN WITH ENHANCED SYNCHRONIZATION PROPERTIES (attorney docket no. 96-010-TAP) filed on the same date as this application and hereby incorporated by reference, a first frequency signal 19 is written across the width of a frame 18 in each servo stripe 17. As is known in the art, a measurably different frequency signal such as an erase frequency is written over first frequency signal 19 in a predetermined pattern such as the checkerboard patterns in regions 21 and 22. The horizontal sides of twelve rectangles 20 and 23 in each stripe 17 are substantially parallel to the direction of movement of tape length 11. The six rectangles (12 sides) in each region 21 and 22 define five horizontal interfaces (servo tracks) 24 between frequency signal 19 and rectangles 20, 23 as the outside interfaces 25 along the top and bottom of each stripe 17 are ignored. In the preferred embodiment, rectangles 20 are shown on the left side of areas 21 and 22 and rectangles 23 are shown on the right portion of areas 21 and 22. A servo read element 26 in a tape read head is precisely aligned along interface 24 to read the signal frequency along interfaces 24. That is, dotted line representing interface 24 along the horizontal sides of rectangles 20, 23 passes through the center of servo read element 26. If the servo pattern on the tape moves right to left, then servo read element 26 will alternate between reading frequency 19 across the full width of servo read element 26 between areas 21 and 22 and reading frequency 19 across one half of servo read element 26 and an erase frequency from rectangles 20, 23 across the other half of the width of servo read element 26. Thus, if tape 11 moves as shown in FIG. 2, servo read element 26 will first sense rectangle 20 above track 24 and then sense rectangle 23 below track 24 in each of regions 21 and 22.

As is known in the art, the servo control system in a tape drive determines the position error signal by using the ratio of the difference between the signal amplitude sensed during the first (left) half of patterns 21 or 22 and the signal amplitude sensed during the second (right) half of patterns 21 or 22 divided by the sum of the signal amplitude sensed during the first half of patterns 21 or 22 and the signal amplitude sensed during the second half of patterns 21 or 22 to stay on track. For a head position precisely on track in checkerboard pattern areas 21 or 22 shown in FIG. 2 the ratio will be zero because the signal during each half of the pattern will be the same. If servo read element 26 is above track 24, the polarity of the position error signal will be positive because more of rectangle 20 above track 24 and less of rectangle 23 below track 24 will be read. In response, the track servo will move the head (including servo read element 26) down until the ratio is zero and servo read element 26 is precisely on track 24. Conversely, if servo read element 26 is below track 24, the polarity of the position error signal will be negative because more of rectangle 23 below track 24 and less of rectangle 20 above track 24 will be read. In response, the track servo will move the head (including servo read element 26) up until the ratio is zero and servo read element 26 is precisely on track 24. In this way the tape controller can determine the position of the tape 11 with respect to the servo read element 26 and move the tape head to keep the head servo read element 26 aligned with the servo track along line 24. This alignment ensures precise reading of a data track in data stripes 12 by the data read head (not shown).

While the above described system is used to keep servo read element 26 (and in turn the read head) precisely on a track, the tape controller system does not know whether servo read element 26 is on the right track. As is known in the art, an optical sensor may be used to approximately position the tape head with respect to the tape. However, when precise positioning is required to position a read gap over a data track in data stripe 12, an optical sensor is not accurate enough. That is, with the expected range of tape motion due to guiding being significantly wider than the track pitch, it is not possible to insure that track following will start on the desired track. This could result in the wrong track being read. It would be desirable to have a system in which the servo control circuitry could reliably determine on which track 24 servo read element 26 is located.

A prior art solution to tape positioning is to have sufficient information recorded in the data tracks to permit proper identification of the track prior to starting a read or write operation. This approach requires the tape cartridge to be prerecorded at the factory to insure that all tracks had proper identification before being used in the field. Prewriting all tracks with sufficient information to properly identify each track adds to the cost of each cartridge. In addition, using data track space for identification information affects capacity because the amount of available space on a data track for actual storage of data is reduced.

SUMMARY OF THE INVENTION

The invention is a novel servo stripe pattern which includes a track identification area. The track identification area is positioned over particular servo tracks depending upon the servo stripe location. The tape controller is able to discern whether the sensed track is an odd or even numbered track by the polarity of the position error signal used in the tracking servo. The tape controller then identifies the sensed track by combining the presence or absence of a track identification area with the odd or even track determination.

DESCRIPTION OF THE PREFERRED EMBODIMENT

Figure 1:
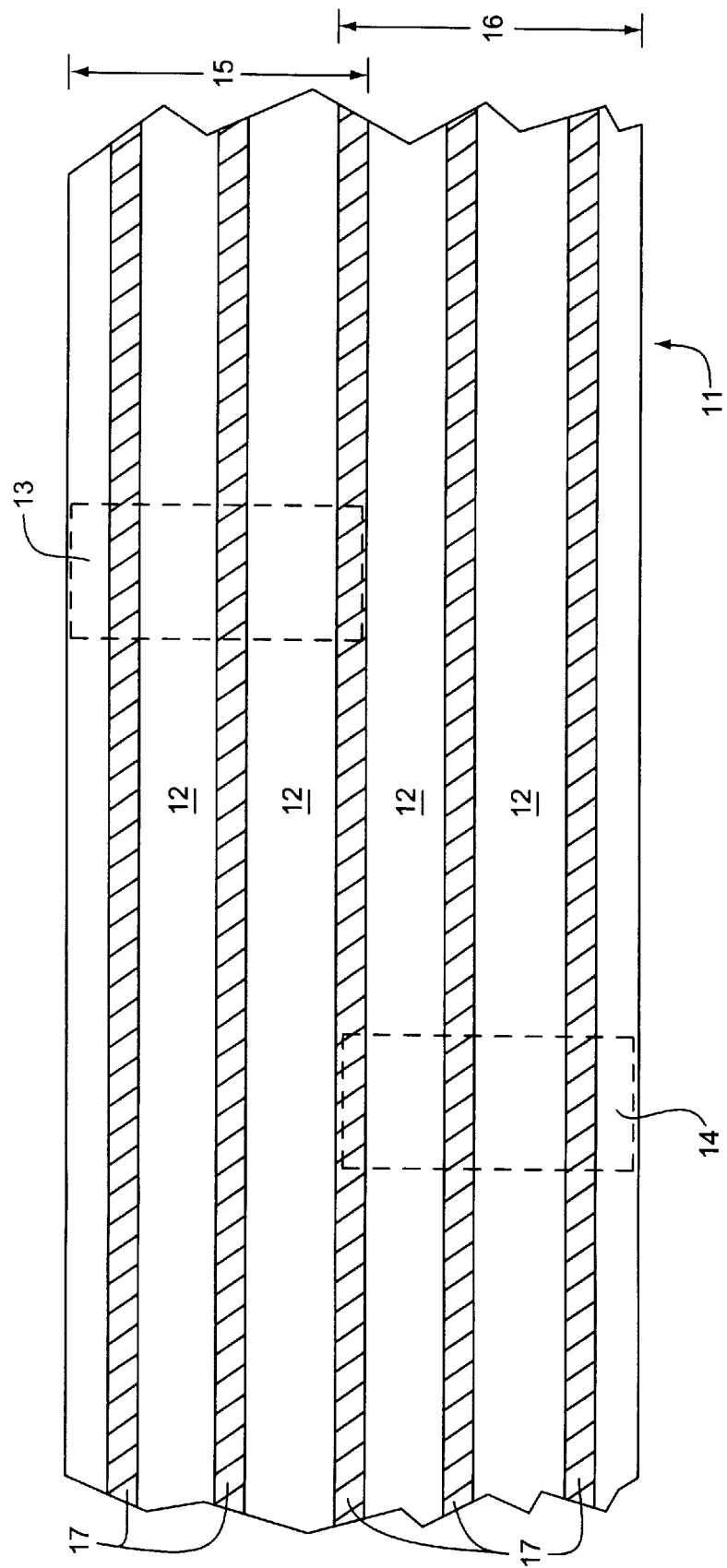
FIG. 1 is an illustration of multiple data and servo stripes in data bands on magnetic tape.
Figure 2:
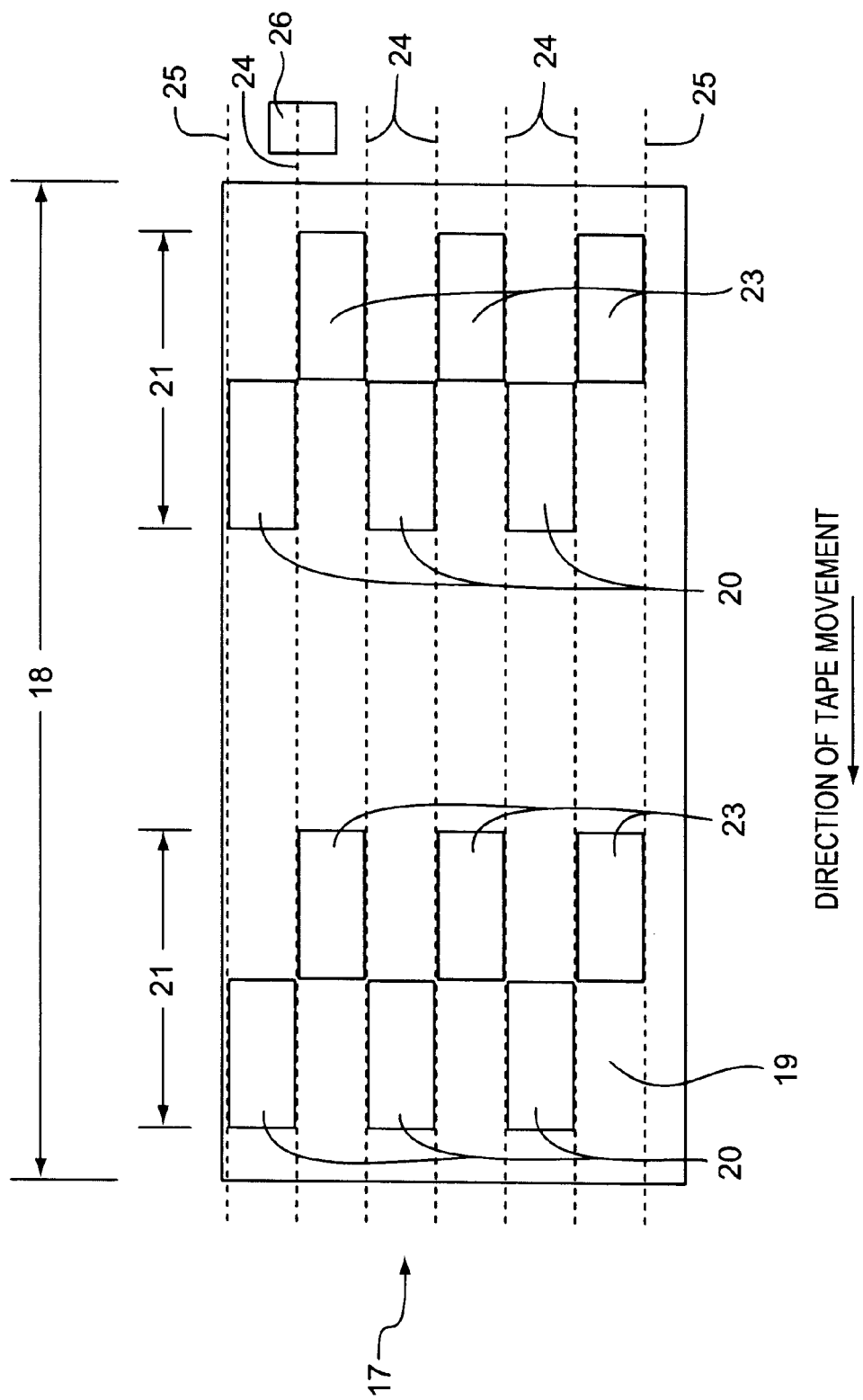
FIG. 2 is an illustration of a servo frame illustrating a servo pattern.

Referring to the drawings wherein like reference numerals denote like structure throughout each of the various figures, FIG. 1 illustrates multiple servo stripes 17 written onto tape 11 to precisely align tape head read gaps over data tracks in data stripes 12. Referring to FIG. 2, servo read element 26 is precisely aligned on track 24 as shown. That is, dotted line representing track 24 passes along the edges of rectangles 23 and through the center of servo read element 26. The tape controller thus knows that servo read element 26 is centered on a track. The tape controller also knows whether the track is an even numbered track or an odd numbered track by the polarity of the position error signal used in the track following servo. What the tape controller does not know is on which odd or even numbered track the tape head is centered. The present invention provides sufficient information to the tape controller to allow it to determine on which track servo read element 26 is centered.

Figure 3:
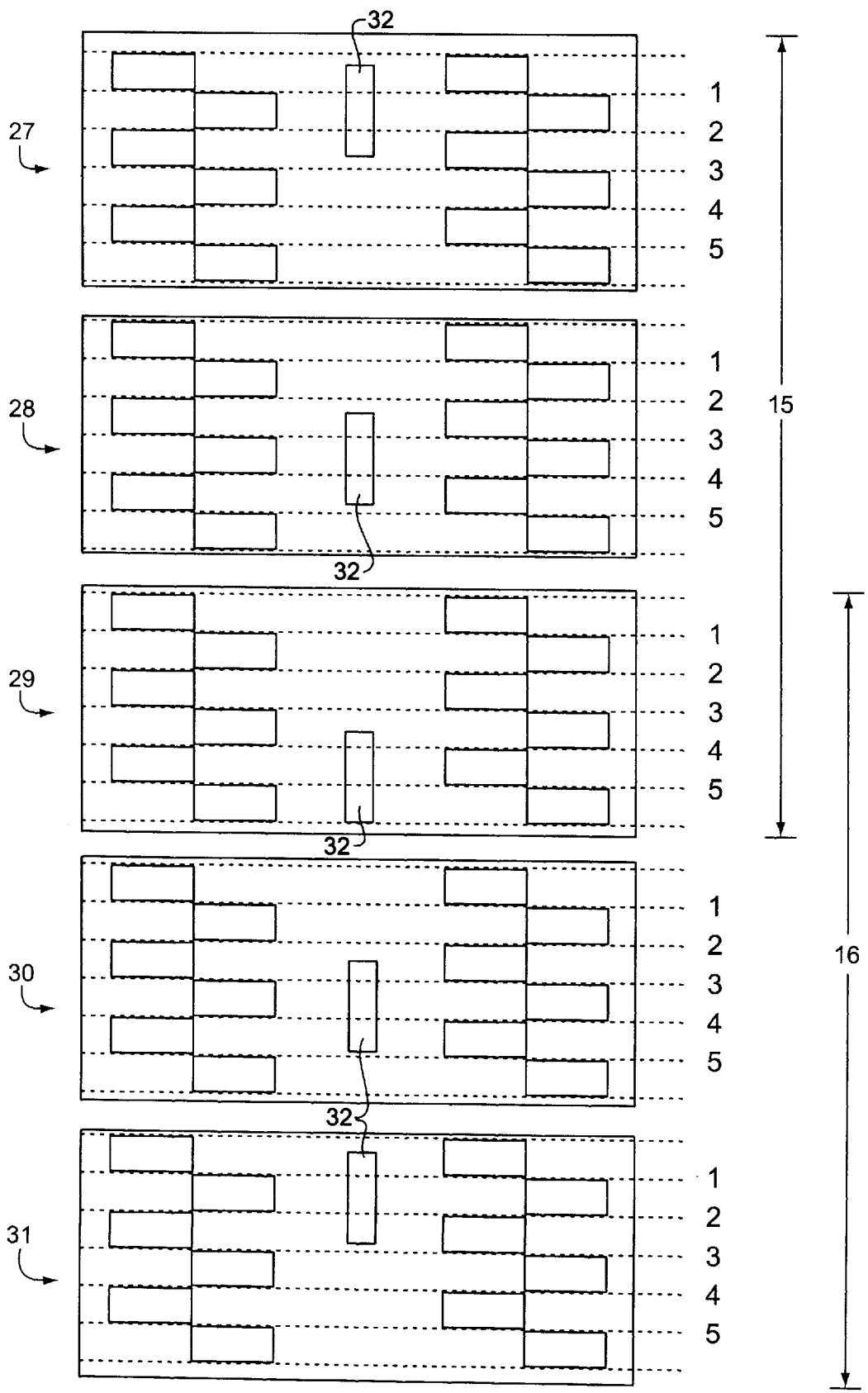
FIG. 3 is an illustration of a multiple servo stripes with a servo pattern including a track identification area in accordance with the invention.

Referring to FIGS. 1 and 3, one frame 18 in each of five servo stripes 17 are shown. In FIG. 3, five stripes, numbered 27, 28, 29, 30, and 31, are shown enlarged and closely spaced for description purposes. As can be appreciated by one skilled in the art, the servo stripes are actually narrow stripes distributed across the active area of the tape. Frame 18 in each servo stripe 27–31 is identical as described with respect to FIG. 2 above except that a track identification area 32 is added to each frame 18 in a unique location. Each stripe has five servo tracks 24 numbered 1 through 5. The servo system knows by the polarity of the position error signal used in the track following servo whether it is following an even numbered track (2 or 4) or an odd numbered track (1, 3, or 5) but it does not know which odd or even numbered track is being followed. For example, if an odd numbered track (i.e. 1) is being followed, then in each of areas 21 and 22, the system will expect the presence of rectangle 20 above track 1 prior to sensing rectangle 23 below track 1. This will be true of all odd numbered tracks. This expectation will cause the odd numbered tracks to be stable equilibrium areas and the even numbered tracks to be unstable equilibrium areas. If the polarity of the position error signal is set for odd numbered tracks and servo read element 26 is located on an even numbered track then the track following servo will move the head to one of the two neighboring odd numbered tracks. If an even numbered track is desired, then rectangle 20 will be expected below the track prior to sensing the rectangle 23 above the track and the polarity of the position error signal sensed by the track following servo will thus be reversed from what it was for the odd numbered tracks. Of course, it will be appreciated by one skilled in the art that the selection of positive and negative polarities for positions above or below the track is one of design choice and could easily be reversed.

As stated above, tape 11 may be divided into an upper band 15 and a lower band 16. That is, the active portion of the read/write head covers approximately half of the width of the tape at any time (i.e. positions 13 and 14 in FIG. 1). For upper band 15, servo stripes 27, 28 and 29 are used for track following by the servo system. Similarly, stripes 29, 30, and 31 are used for lower band 16. When the servo system is in the track following mode, it will be attempting to keep the centerline of the three servo read gaps 26 over the desired track centerline in each of three stripes (27,28, 29 or 29,30,31). For example, when the system is following track 2 in the upper band 15, the servo system will have a read element 26 centered on track 2 in each of stripes 27,28 and 29.

In order to identify the track being followed a track identification area 32 is added to each frame 18. In the preferred embodiment, track identification area 32 is written in a rectangular configuration over two of the five servo tracks 24 in each servo stripe 17. The location on the frame varies among the servo stripes 17. The location of track identification area 32 is the same in stripes 27 and 31 (over tracks 1 and 2) and the location is the same in stripes 28 and 30 (over tracks 3 and 4). In stripe 29 track ID 32 is over tracks 4 and 5. Stripe 29 is common to both bands 15 and 16. Any two of the three stripes (27, 28 29) or (29, 30, 31) are sufficient to identify the track being followed. This permits one stripe to be ignored when tape defects or other problems are encountered. Track ID 32 is detected when the servo system is in the track following mode and servo read element 26 is passing the longitudinal portion of the servo frame 18 where track ID 32 is recorded. In the preferred embodiment, the erased area comprising track ID 32 is detected when the signal level in the area is less than a predetermined threshold value. For example, this threshold value could be 10% of the nominal level of signal 19. The locations of the lateral edges of the erased area 32 with respect to the track centerlines 24 are a function of the threshold level, the residual signal (how much is left after erase) in the erased area 32, and the desire to minimize detection error.

Referring to FIG. 3, track ID 32 in stripe 27 is detected when the system is following track 1 or 2. As described above, the servo knows if the track 24 is an odd or even track from the polarity of the position error signal. Thus, using only stripe 27, the system is capable of uniquely identifying tracks 1,2, and 4 but it could not distinguish between tracks 3 and 5. Track 1 is distinguished because the track ID 32 is detected and the system knows it is following an odd track 24. Similarly, track 2 is identifiable because of the presence of track ID 32 and because it is an even track. Track 4 is detected because track ID is not present and it is an even track. Tracks 3 and 5 are indistinguishable from each other because they are both odd and neither has a track ID 32. The same analysis holds for stripe 31 which has an identical configuration as stripe 27. Stripes 28 and 30 also have identical configurations and, applying the same analysis as above, tracks 2, 3, and 4 can be identified in stripes 28 and 30 but the system cannot distinguish between tracks 1 and 5. Applying the analysis to stripe 29 in FIG. 3, tracks 2, 4 and 5 can be identified but tracks 1 and 3 in stripe 29 are indistinguishable.

With tape 11 divided into two bands 15 and 16, either stripes 27, 28 and 29 or stripes 29, 30 and 31 are available at any one time. As stated above, any combination of two of the three available stripes from a set of three is sufficient for the system to uniquely identify the track being followed by the servo system. The third stripe in each set is used for redundancy purposes in the event of a scratch or other defect on the tape.

Figure 4:
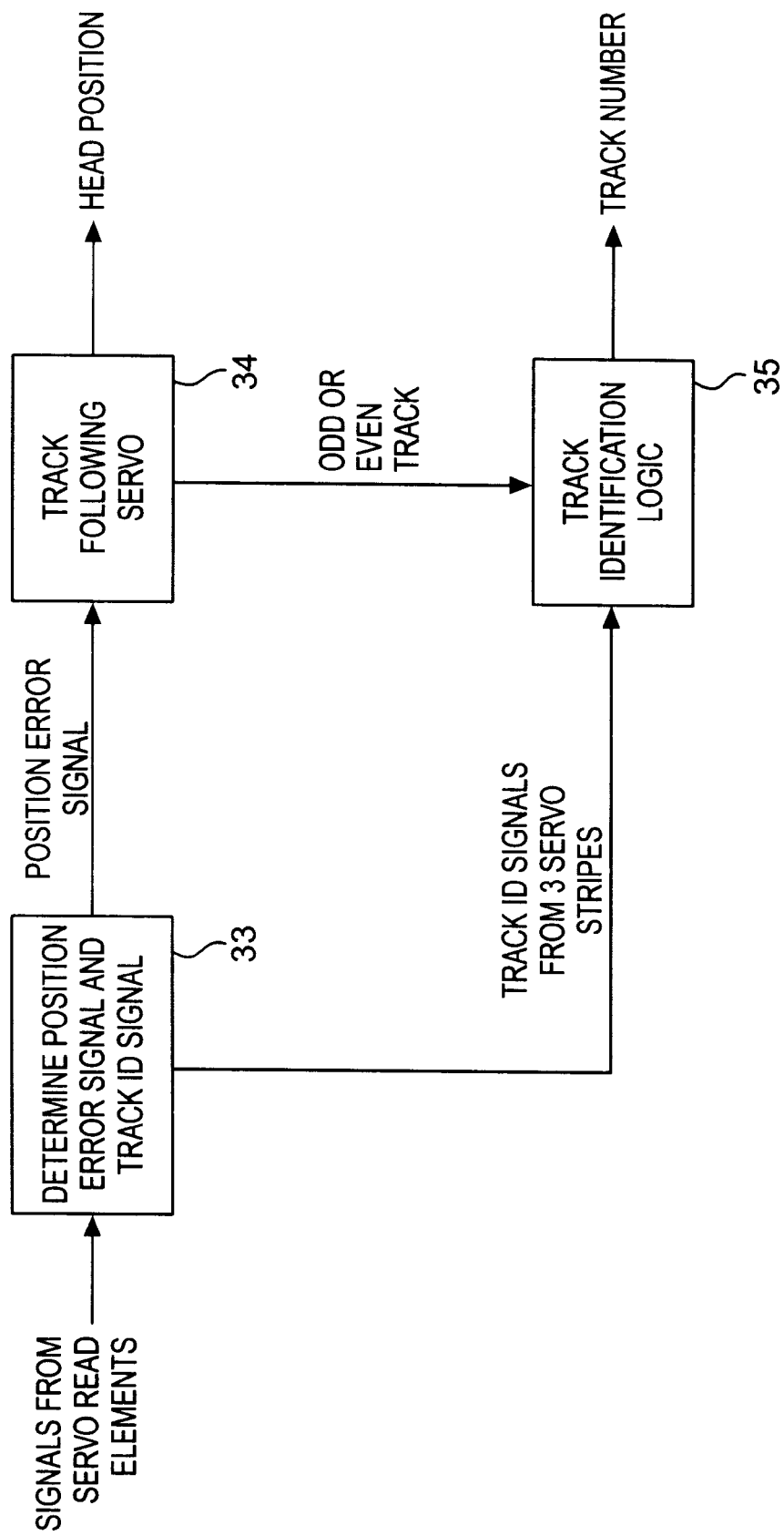
FIG. 4 is a block diagram illustrating the track identification method used by the tape controller.

Referring to FIG. 4, the identification of a track 24 in FIG. 3 is as follows. Assume the system is operating in band 15 (stripes 27, 28, and 29) but that stripe 29 is unavailable as it is not needed. With servo read element 26 centered on track 5 in stripes 27 and 28, the tape controller logic 33 receives the signals from element 26 and determines the position error signal and the presence (or absence) of track identification area 32. The polarity of the position error signal is used by the servo system 34 to position the read head. The tape controller knows that one of tracks 1, 3, or 5 is being followed. However, because tape controller logic 33 did not determine the presence of track ID 32 from the signal on the track being followed in stripe 27, track 1 is eliminated as a candidate by tape controller logic 35. Similarly, because no track ID 32 was detected on the track being followed in stripe 28, track 3 is eliminated by tape controller logic 35. Track 5 is the only common candidate from stripes 27 and 28 and it is identified by tape controller logic 35 as the track being followed.

While the invention has been described with respect to a particular embodiment thereof, it is not to be so limited as changes and modifications may be made which are within the full intended scope of the invention as defined by the appended claims. For example, while specific numbers of servo tracks and data tracks have been disclosed, the invention may be utilized with more or less servo or data tracks without departing from the scope of the invention. The rectangular configuration of track identification area 32 may also be modified and could intersect one or more servo tracks depending upon the number of servo tracks in a servo stripe. Similarly, while a particular checkerboard tape servo pattern has been disclosed, different types of patterns may be employed without departing from the scope of the invention.

What is claimed is:

1. A servo-written length of magnetic tape comprising:
   a plurality of data tracks written on and extending longitudinally along the tape; and
   a plurality of servo tracks written on and extending substantially continuously in the longitudinal direction along the tape adjacent to each other and substantially in parallel with the data tracks, the plurality of servo tracks comprised of a series of frames along the tape, each frame comprising at least one characteristic determining each servo track as an even servo track or an odd servo track, each frame further comprising an identification signal written onto a portion of the frame and extending laterally across some, but not all, of the servo tracks in the plurality of servo tracks, thereby to distinguish at least some of the even and odd tracks in the plurality of servo tracks.

2. A servo-written tape as in claim 1 wherein the identification signal extends across one odd track and one even track.

3. A servo-written tape as in claim 1 further comprising:
   at least one additional plurality of servo tracks provided on the tape laterally spaced from and parallel to the first plurality of servo tracks, each servo track in each of the at least one additional plurality of servo tracks having a corresponding servo track in the first plurality of servo tracks, each of the additional plurality of servo tracks comprised of a series of frames along the tape; and
   at least one additional identification signal written onto a portion of each frame and extending laterally across some, but not all, of the servo tracks in the at least one additional plurality of servo tracks, the servo tracks crossed by the additional identification signal forming a set at least partially different from the set of corresponding servo tracks crossed by the first identification signal in the first plurality of servo tracks.

4. A servo-written tape as in claim 3 wherein the combination of a particular servo track being odd or even, the presence or absence of the identification signal across the particular servo track in the first plurality of servo tracks, and the presence or absence of at least one additional identification signal across the corresponding servo track in at least one of the additional plurality of servo tracks is a unique combination for each servo track in the first plurality of servo tracks.

5. A servo-written tape as in claim 4 comprising three pluralities of servo tracks, each plurality of servo tracks comprising at least five servo tracks, the identification signal in the first plurality of servo tracks extending across the first and second tracks in the first plurality of servo tracks, the identification signal in the second plurality of servo tracks extending across the third and fourth servo tracks in the second plurality of servo tracks, and the identification signal in the third plurality of servo tracks extending across at least the fifth servo track in the third plurality of servo tracks.

6. A servo-written tape as in claim 5 wherein each plurality of servo tracks has six servo tracks and wherein the identification signal in the third plurality of servo tracks extends across the fifth and sixth servo tracks in the third plurality of servo tracks.

7. A servo-written tape as in claim 5 comprising an additional two such pluralities of servo tracks forming a fourth plurality of servo tracks and a fifth plurality of servo tracks, each of the additional two pluralities of servo tracks having an identification signal in each frame, the identification signal in the fourth plurality of servo tracks extending across servo tracks corresponding to servo tracks in the second plurality of servo tracks crossed by the identification signal in the second plurality of servo tracks, the identification signal in the fifth plurality of servo tracks extending across servo tracks corresponding to servo tracks in the first plurality of servo tracks crossed by the identification signal in the first plurality of servo tracks, wherein the combination of odd and even tracks and the presence or absence of the identification signals across servo tracks in the third plurality of servo tracks, fourth plurality of servo tracks, and fifth plurality of servo tracks provides a unique combination for each servo track in at least one of the third plurality of servo tracks, fourth plurality of servo tracks, and fifth plurality of servo tracks.

8. A servo-written tape as in claim 1 wherein the servo tracks comprise:

a first signal including a first frequency written onto a second portion of the frame and extending across the entire plurality of servo tracks; and a second signal including a second frequency written in a predetermined pattern over selected areas of the second portion, the first and second signals together defining the servo tracks.

9. A servo-written tape as in claim 8 wherein the second frequency is about one half of the first frequency.

10. A servo-written tape as in claim 8 wherein the second frequency is an erase frequency.

11. A servo-written tape as in claim 1 wherein the identification signal is written at an erase frequency.

12. A method for writing a plurality of servo tracks extending substantially continuously in a longitudinal direction along a length of magnetic tape, the plurality of servo tracks divided into a sequence of frames, the method comprising:

writing a first frequency signal extending laterally across the entire portion of the tape on which the plurality of servo tracks is to be written;

writing a second frequency signal in a predetermined pattern over selected areas of the first frequency signal, wherein the first frequency signal and the second frequency signal define each servo track in the plurality of servo tracks as one of an even numbered servo track and an odd numbered servo track;

writing a third frequency signal as an identification signal in a predetermined location in the frame, the third frequency signal extending laterally across some, but not all, of the servo tracks in the plurality of servo tracks; and repeating writing a first frequency signal, writing a second frequency signal, and writing a third frequency signal for each frame in the sequence of frames.

13. A method as in claim 12 wherein the plurality of servo tracks is a first plurality of servo tracks, the method further comprising writing multiple first, second, and third signals spaced laterally across the tape to create at least one additional plurality of servo tracks, each servo track in the additional plurality of servo tracks having a corresponding servo track in the first plurality of servo tracks, the combination of a particular servo track in the first plurality of servo tracks being even or odd, the presence or absence of the identification signal across the particular servo track in the first plurality of servo tracks, and the presence or absence of the identification signal across at least one servo track in at least one additional plurality of servo tracks corresponding to the particular servo track creating a unique combination for each servo track in the first plurality of servo tracks.

* * * * *